United States Patent

[11] 3,624,755

[72] Inventor Jacques Lambert
Paris, France
[21] Appl. No. 8,185
[22] Filed Feb. 3, 1970
[45] Patented Nov. 30, 1971
[73] Assignee Flaminaire Marcel Quercia
Paris, France
[32] Priority Feb. 7, 1969
[33] France
[31] 69 02966

[54] CONNECTING DEVICES FOR THE FLUIDTIGHT FLOW OF FLUID BETWEEN TWO ENCLOSURES
10 Claims, 6 Drawing Figs.
[52] U.S. Cl............................................. 141/293,
137/614.04, 141/348
[51] Int. Cl....................................................... B65b 1/04,
B65b 3/04
[50] Field of Search........................................... 141/1–4,
346–352, 311, 392, 293, 382, 20, 292; 251/DIG. 3;
128/218 N, 218 NV, 220, 349 BV, DIG. 5;
137/614.03, 614.04

[56] References Cited
UNITED STATES PATENTS

| 2,118,300 | 5/1938 | Ford................................ | 251/DIG. 3 |
| 3,307,595 | 3/1967 | Berning et al................... | 141/4 |
| 3,399,677 | 9/1968 | Gould et al...................... | 128/349 BV |
| 3,469,572 | 9/1969 | Nehring........................... | 128/2 R |
| 3,478,743 | 11/1969 | Ericson........................... | 128/349 BV |

Primary Examiner—Houston S. Bell, Jr.
Attorney—Michael S. Striker

ABSTRACT: The connecting device is constituted of two parts each of which is adapted to communicate with a respective enclosure. When the two parts are urged together a fluidtight passage between the two enclosures is opened. One part is a male part and includes a cylindrical tip containing a duct connected to the enclosure and opened also on the cylindrical portion of the tip between its end and an axial shoulder. An elastic sleeve is threaded on the tip, supported on the shoulder and masks the outlet with the duct in fluidtight manner. The other part, the female part, has a junction zone communicating with the other enclosure through an orifice of greater diameter than the cylindrical tip and less than the outer diameter of the elastic sleeve. When the two parts are urged together the elastic sleeve seals against the junction zone.

PATENTED NOV 30 1971

INVENTOR:
JACQUES LAMBERT

By: Michael S. Striker
Attorney

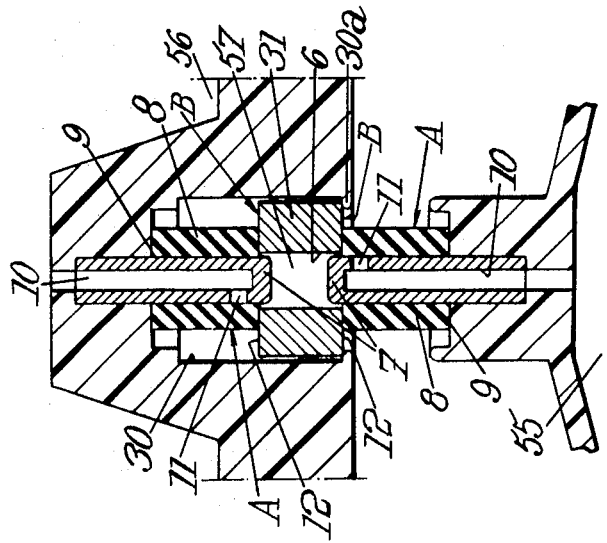
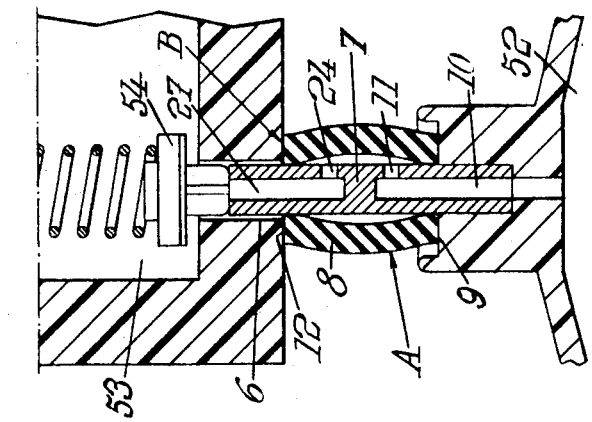

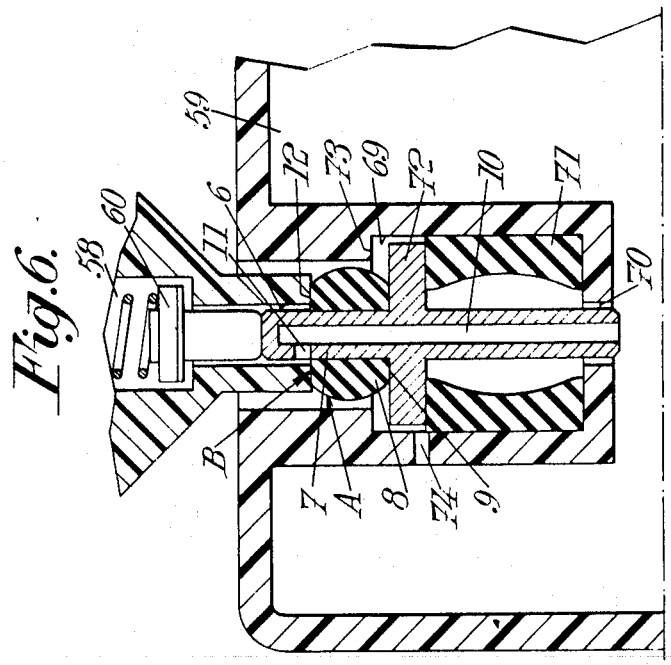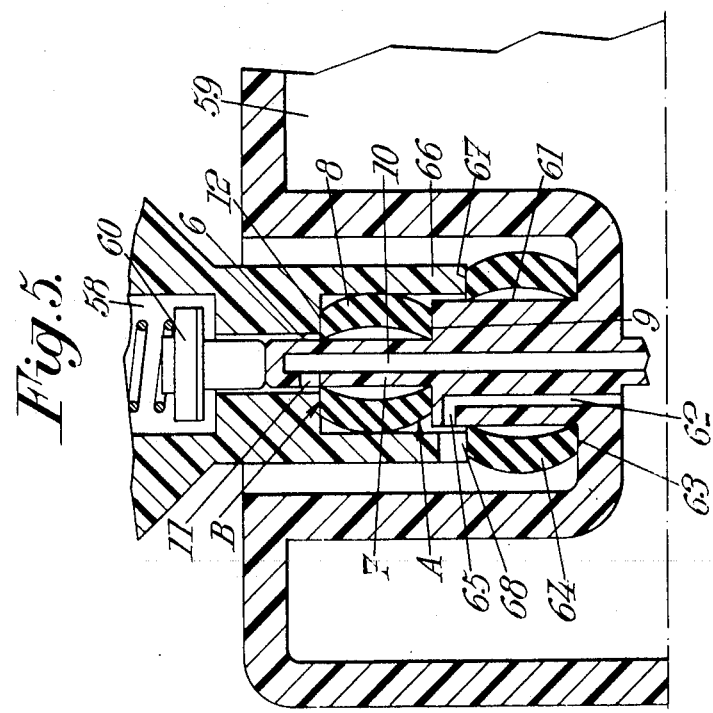

3,624,755

CONNECTING DEVICES FOR THE FLUIDTIGHT FLOW OF FLUID BETWEEN TWO ENCLOSURES

The present invention relates to connecting devices for the fluidtight flow of a fluid between two enclosures.

There are known such devices, which are constituted of two parts each communicating with an enclosure and arranged so that when the said parts are supported against one another they define a fluidtight passage between the two above-said enclosures.

In these connecting devices, the main problem to be solved resides in the obtaining of fluidtightness as perfect as possible at the level of the two parts of the connecting device when these two parts are supported against one another.

In addition, one at least of the two enclosures is closed when the two parts of the connecting device are not supported against one another, this enclosure having to be opened to enable the flow of fluid when the two above-said parts are supported against one another, the opening having to occur preferably after sealing at the level of the two parts of the connecting device has been effected.

It is an object of the invention to provide a connecting device enabling satisfactory fluidtightness to be obtained at the level of the two parts of the connecting device when these two parts are supported against one another.

It is another object of the invention to provide a connecting device in which the opening of the enclosure which is closed can only take place when sealing at the level of the two parts of the connecting device has been effected, which avoids any risk of leakage of fluid.

It is also an object of the invention to provide a simple, reliable, connecting device of little bulk, and of reduced cost of manufacture.

By reason of its advantages (good sealing, absence of leakage, simplicity, reliability, small bulk and low cost), the connecting device according to the invention is more particularly applied to produce fluidtight passage of a liquid or gaseous fuel between a recharging unit and a cigarette lighter or gas lighter reservoir.

The connecting device according to the invention is constituted of two parts each communicating with an enclosure and arranged so that when the said parts are supported against one another they define a fluidtight passage between the two above-said enclosures, and it is characterized by the fact that, one of the parts, hereinafter called male part, includes, on one hand, a cylindrical tip in which is arranged a duct connected to the corresponding enclosure which constitutes the closed enclosure, this duct opening onto the cylindrical part of the tip between its end and an axial shoulder rigidly fixed to the tip, and, on the other hand, an elastic sleeve threaded on this tip and supported by one of its ends on the above-said axial shoulder, this elastic sleeve having a length such that it masks the outlet of the duct, and an inner diameter—before mounting—such that it grips the cylindrical surface of the tip so as to seal the above-said outlet in fluidtight manner, and the other part, hereinafter called female part, includes a junction zone pierced by an orifice communicating, if necessary through a valve, with the other enclosure, this orifice having a diameter greater than the diameter of the cylindrical tip and less than the outer diameter of the elastic sleeve, the facing surfaces of the elastic sleeve and of the junction zone being such that, when the male and female parts are supported against one another, there is fluidtightness between the elastic sleeve and the junction zone.

In order that the invention may be more fully understood, several embodiments of connecting devices according to the invention are described below, purely by way of illustrative but nonlimiting examples, with reference to the accompanying drawings, in which:

FIG. 3 shows in section the two parts of a second embodiment of a connecting device according to the invention;

FIG. 4 shows in section the two parts of a third embodiment of a connecting device according to the invention; and FIGS. 5 and 6 show in section the two parts of a fourth embodiment according to the invention, as two variations.

Figure 1:
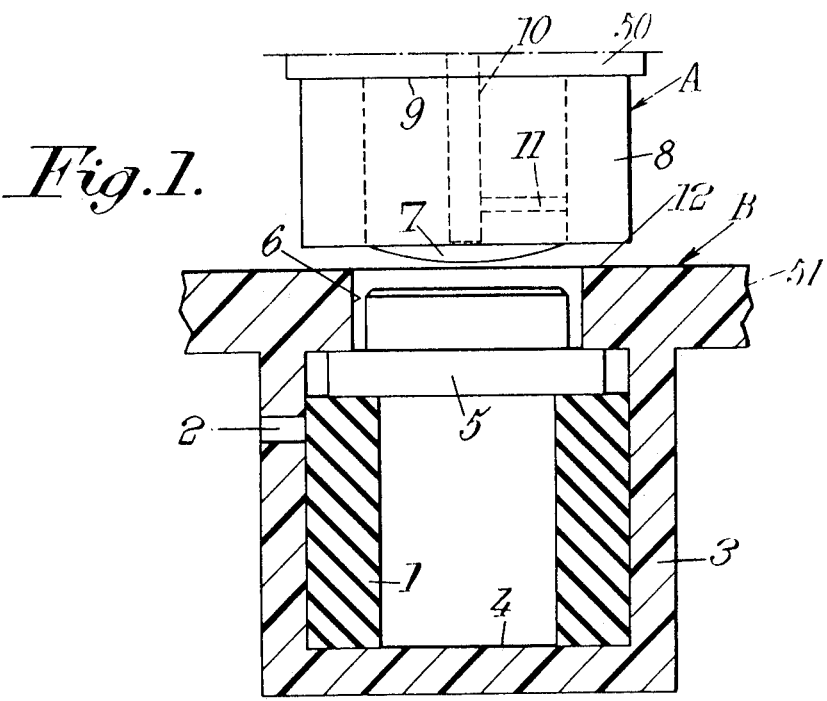
FIGS. 1 and 2, show in section and in various relative positions, the two parts of one embodiment of a connecting device according to the invention.

As shown in FIGS. 1 to 6, the connecting device is constituted of two parts A and B, each communicating with an enclosure, and arranged so that when the said parts are supported against one another they define a fluidtight passage between the two above-said enclosures.

According to the invention, one of the parts, called hereinafter male part A, includes, on one hand, a tip 7 in which is arranged a duct 10 connected to the corresponding enclosure which constitutes the closed enclosure, this duct opening onto the circumference of the tip between its end and an axial shoulder 9 rigidly fixed to the tip 7, and, on the other hand, an elastic sleeve 8 surrounding this tip 7 and supported by one of its ends on the above-said axial shoulder 9, this elastic sleeve having a length such that it masks the outlet 11 of the duct 10, and an interior diameter—before mounting—such that it grips the cylindrical surface of the tip 7 so as to seal in fluidtight manner the above-said outlet 11.

The other part, called hereinafter female part B, includes a junction zone 12 pierced by an orifice 6 communicating, if necessary by means of a valve, with the other enclosure, this orifice 6 having a diameter greater than the diameter of the tip 7 and less than the outer diameter of the elastic sleeve 8, the facing surfaces of the elastic sleeve 8 and of the junction zone 12 being such that, when the male A and female B parts are supported against one another, there is fluidtightness between the elastic sleeve 8 and the junction zone 12.

Figure 2:
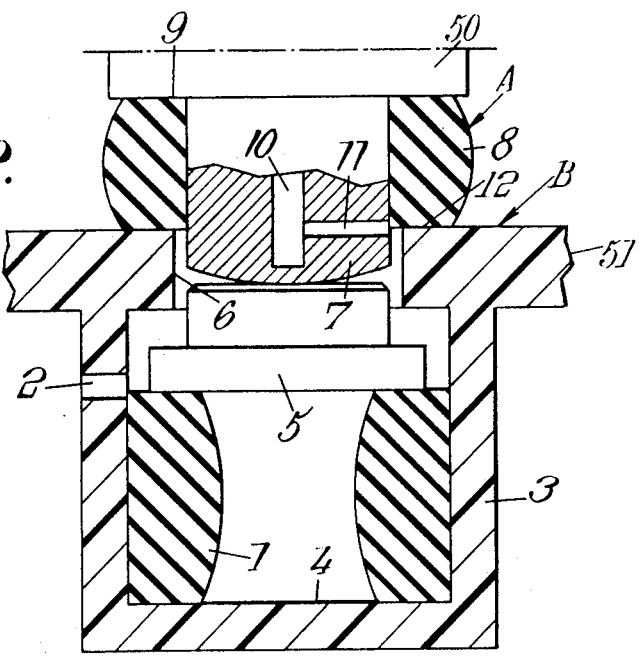

FIGS. 1 and 2 show a first embodiment of a connecting device between a recharging unit 50 and a lighter or gas lighter reservoir 51. In this embodiment, the male part A is incorporated with the recharging unit 50, and the female part B is incorporated with the reservoir 51.

The orifice 6 of the female part B communicates with the inside of the reservoir 51 by means of an automatic valve whose opening is caused by the penetration of the tip 7 into the orifice 6.

This automatic valve can comprise, a pusher 5 projecting into the orifice 6, this pusher 5 being shielded in a cylindrical cavity 4 in communication with the inside of the reservoir 51 by a passage 2 arranged in the cylindrical wall of this cavity 4, and an elastic bushing 1 acting as an elastic return means for the pusher 5 and as a sealing means with regard to the passage 2.

In FIG. 1, the connecting device is shown in a relative position in which the two parts A and B are not supported against one another, while in FIG. 2 the connecting device is shown in its position in which the two parts A and B are supported against one another.

FIG. 3 shows a second embodiment of a connecting device according to the invention between a recharging unit 52 and a lighter or gas lighter reservoir 53. As previously, the male part A is incorporated with the recharging unit 52 and the female part B is incorporated with the reservoir 53.

The orifice of the female part B communicates with the inside of the reservoir 53 through an automatic valve 54 whose opening is caused by the penetration of a cylindrical tip 7 into the orifice 6.

This cylindrical tip 7 includes a conduit 27 starting from its end which penetrates into the orifice 6 and ending at the outlet 24 situated in the zone of the cylindrical part of the said tip 7 which is gripped by the elastic sleeve 8.

When the male part A is applied against the female part B, the elastic sleeve 8 is deformed by being bulged outwardly, which places in communication the two outlets 11 and 24, and via the same the two conduits 10 and 27 which communicate with the recharging unit 52 and the reservoir 53, respectively.

FIG. 4 shows a third embodiment of a connecting device between a recharging unit 55 and a lighter or gas lighter reservoir 56.

In this embodiment, there is utilized an intermediate chamber 57 incorporated with the reservoir 56. This intermediate chamber 57 constitutes two female parts B respectively for a male part A incorporated with the recharging unit 55 and for a male part A incorporated with the reservoir 56.

The chamber 57 has a small volume with respect to the enclosures constituted by the recharging unit 55 and the reservoir 56, and is defined by a bushing 31 mounted in a bore 30 so as to be freely slidable in the said bore 30 since there is not any problem of fluidtightness to resolve between this bushing 31 and this bore 30.

It will be noted that the elastic sleeve 8 of the male part A incorporated with the reservoir 56 has, in the relaxed position, a slight axial prestressing so as to urge the bushing 21 against an axial stop 30a.

In this FIG. 4, the male and female parts of the connecting device between the recharging unit 55 and the intermediate chamber 57, and the male and female parts of the connecting device between the intermediate chamber 57 and the reservoir 56, are shown in their position of contact against one another, but not yet urged against one another.

FIGS. 5 and 6 show a fourth embodiment of the connecting device according to the invention between a recharging unit 58 and a lighter or gas lighter reservoir 59, this connecting device being arranged to place in communication the reservoir 59 with the atmosphere during the time of filling, that is to say during the period in which the male and female parts A and B of the connecting device are urged against one another.

In this embodiment, the male part A of the connecting device is incorporated with the reservoir 59, whilst the female part B of the connecting device is incorporated with the recharging unit 58 which includes an automatic valve 60 enabling the orifice 6 to communicate with the interior of the recharging unit 58, the opening of this automatic valve 60 being caused by penetration of the cylindrical tip 7 into the orifice 6.

In the variation illustrated in FIG. 5, the cylindrical tip 7 is extended towards the wall of the reservoir 59 by a cylindrical bearing 61 of a diameter greater than the diameter of the cylindrical tip 7, and in which there is a conduit 62 communicating with the inside of the reservoir 59, this conduit 62 opening onto the cylindrical part of this bearing 61 between its end and an axial shoulder 63 rigidly fixed to the said bearing 61.

An elastic bushing 64 is placed around this cylindrical bearing 61 and is supported, by one of its ends, on the above-said axial shoulder 63, this elastic bushing 64 having a length such that it masks the outlet 65 of the conduit 62, and an inner diameter—before mounting—such that it grips the cylindrical bearing 61 so as to seal in fluidtight manner the above-said outlet 65.

The junction zone 12 is surrounded by an annular extension 66 of the unit 58, the end of the extension 66 having an annular bearing 67 of an inner diameter greater than the diameter of the cylindrical bearing 61 but less than the outer diameter of the elastic bushing 64, a passage 68 being provided in this annular extension 66 to place the outlet 65 in communication with the atmosphere when the male and female parts are supported against one another (relative position shown in FIG. 5).

In the variation illustrated in FIG. 6, the cylindrical tip 7 is mounted sliding in a bore 69 formed in a part of the wall of the reservoir 59 and having a hole 70 arranged in its bottom, through which the cylindrical tip 7 opens into the interior of the reservoir 59, the sliding being effected against the action of an elastic bushing 71 interposed between the bottom of the bore 69 and a flange 72 rigidly fixed to the cylindrical tip 7. The elastic bushing 71 urges the cylindrical tip 7 against a stop 73, a passage 74 being arranged in the bore 69 so that it is masked by the elastic bushing 71 when the male and female parts are not urged against one another, and is unmasked by the elastic bushing 71 when the male and female parts are urged against one another, which establishes communication between the inside of the reservoir 59 and the atmosphere (relative position shown in FIG. 6).

What I claim is:

1. A sealing arrangement, comprising a pair of components being movable relative to one another and each having an interior, one of said components having an exposed face; a recess of predetermined inner diameter extending inwardly from said exposed face and communicating with the interior of said one component; a projection extending from the other of said components and having a peripheral surface and a leading end adapted to be inserted into said recess, said projection being provided with an interior passage communicating with the interior of said other component and with an aperture provided in said peripheral surface rearwardly of said leading end; and an annular sleeve of elastomeric material surrounding said projection in frictional engagement and normally overlying and sealing said aperture, said sleeve having an outer diameter greater than said inner diameter and two axial ends one of which is fixedly retained and the other of which sealingly abuts said exposed face on initial entry of said leading end into said recess, with subsequent elastic axial compression of said sleeve and exposure thereby of said aperture in response to relative movement of said components in a sense inserting said leading end further into said recess.

2. A sealing arrangement as defined in claim 1 further comprising normally closed valve means in said one component and positioned to be opened in response to contact with said projection upon said relative movement of said components.

3. A sealing arrangement as defined in claim 1 wherein said projection is of cylindrical configuration.

4. A sealing arrangement as defined in claim 2 said valve means comprising a valve seat, a valve member adapted to engage said valve seat, an elastically deformable bushing engaging said valve member and urging the same against said valve seat, and an extension projecting from said valve member into said recess for engagement by said leading end of said projection and displacement by the same in a sense effecting movement of said valve member from said valve seat against the urging of said bushing.

5. A sealing arrangement as defined in claim 1; further comprising an additional recess inwardly of said recess and communicating therewith, an additional projection similar to the first-mentioned projection accommodated in said additional recess and surrounded by an additional sleeve similar to the first-mentioned sleeve.

6. A sealing arrangement as defined in claim 5 said one component comprising a rigid bushing slidably accommodated in said recess and having one axial endface abutting said additional sleeve, and an other axial endface constituting a part of said exposed surface and adapted to abut the first-mentioned sleeve.

7. A sealing arrangement as defined in claim 1; further comprising vent means communicating with the interior of one of said components and normally closed by said sleeve, said vent means being adapted to open and communicate with the ambient atmosphere in response to said relative movement of said components.

8. A sealing arrangement as defined in claim 1 wherein a first of said components is a gas-fuelled lighter and the second of said components is gas-containing recharging unit for refuelling said lighter.

9. A sealing arrangement as defined in claim 8 wherein said second component is said other component.

10. A sealing arrangement as defined in claim 8 wherein said second component is said one component.

* * * * *